C. T. ALLCUTT.
CIRCUIT INTERRUPTING DEVICE.
APPLICATION FILED SEPT. 1, 1917.

1,385,980.

Patented Aug. 2, 1921.

WITNESSES:

INVENTOR
Chester T. Allcutt
BY
ATTORNEY

UNITED STATES PATENT OFFICE.

CHESTER T. ALLCUTT, OF WILKINSBURG, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING DEVICE.

1,385,980.        Specification of Letters Patent.        Patented Aug. 2, 1921.

Application filed September 1, 1917. Serial No. 189,344.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Circuit-Interrupting Devices, of which the following is a specification.

My invention relates to circuit-interrupting devices, and particularly to means for automatically interrupting electric circuits under predetermined conditions.

One object of my invention is to provide a quick-acting tripping device for circuit interrupters that shall be energized from the circuit to be protected only when the current traversing the circuit exceeds a predetermined value.

Another object of my invention is to provide a device for controlling a tripping device of the above indicated character that shall have no moving parts, be simple and inexpensive to construct and effective in its operation.

In practising my invention, I provide a circuit interrupter, a trip coil therefor and a series transformer for operatively connecting the trip coil to the circuit to be protected. A spark gap is connected between the transformer and the trip coil and is so adjusted that it discharges or breaks down only when the potential variation in the circuit to be protected exceeds a predetermined value. Thus, the trip coil may be quickly actuated and develops a maximum torque under its operating conditions.

Figure 1:
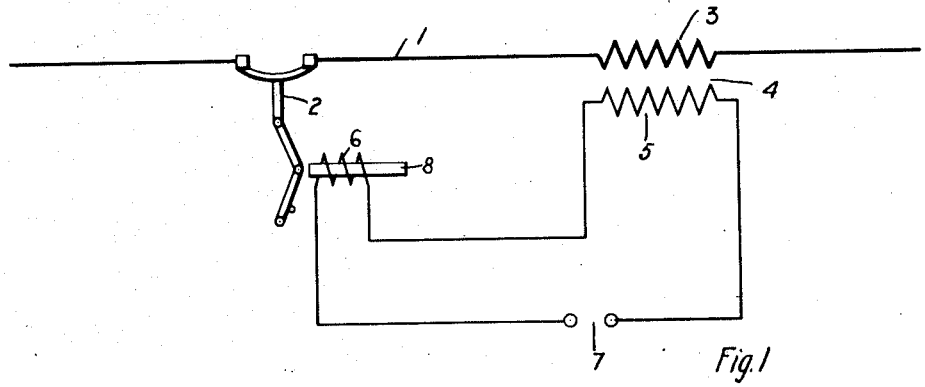
Figure 2:
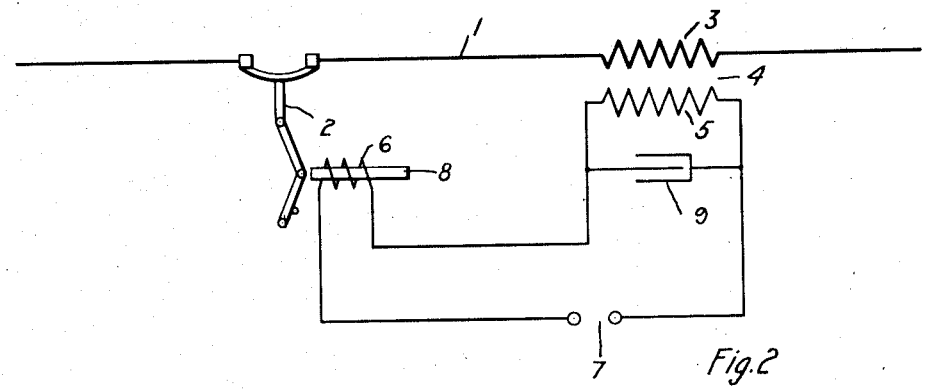
Figure 3:
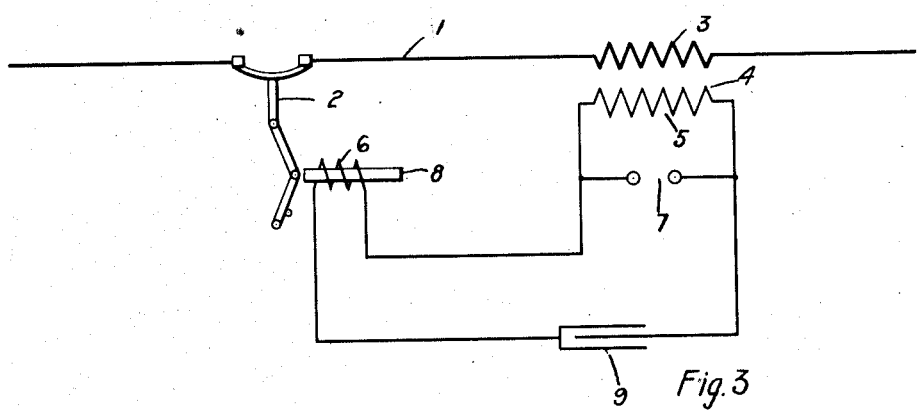

In the accompanying drawings, Figure 1 is a diagrammatic view of an electric circuit embodying my invention, and Figs. 2 and 3 are diagrammatic views of electric circuits embodying modified forms of my invention.

An alternating-current electric circuit 1 is provided with a circuit interrupter 2 that is adapted to be tripped when the potential variation in the circuit exceeds a predetermined value. The primary winding 3 of a series transformer 4 is operatively connected in the circuit 1. One terminal of the secondary winding 5 of the transformer 4 is connected to one terminal of the trip coil 6. The other terminal of the winding 5 is connected to one terminal of a spark gap 7, the other terminal of which is connected to the other terminal of the trip coil 6.

The current transformer 4 is adapted to have its secondary winding normally open-circuited and of a potential that is substantially proportional to the current traversing the primary winding of the same. The spark gap 7 is so adjusted that, when the potential variation in the circuit 1 exceeds a predetermined value, it will discharge or break down to effect closed-circuit relation between the trip coil 6 and the secondary winding of the transformer 4. The trip coil 6 has such characteristics that it exerts its maximum torque when the voltage corresponding to the overload traversing the circuit 1 is impressed thereacross. Thus, the movable member 8 of the trip coil 6 will be actuated quickly to trip the interrupter 2 under predetermined conditions, and, since the winding 6 is only energized when it is desired to trip the interrupter 2, the detrimental effects of permitting the trip coil to be supplied with current under all conditions is obviated. That is, the movable member 8 will not creep toward its actuated position as the load increases but will be quickly actuated to effectively trip the interrupter 2.

In Fig. 2 of the drawings, a condenser 9 is operatively connected across the terminals of the secondary winding 5 of the transformer 4 and is adapted to discharge an oscillating current through the trip coil 6 when the spark gap 7 is broken down for the purpose of increasing the magnetic attraction exerted on the movable member 8 by the trip coil and, consequently, insuring effective operation of the same.

In Fig. 3 of the drawings, the spark gap 7 is connected across the terminals of the winding 5, and the condenser 9 is connected in series with the trip coil 6 and the winding 5. With this arrangement, when the spark gap 7 breaks down by reason of a potential variation in the circuit 1, the condenser 9 will discharge through the spark gap 7 and the trip coil 6 to cause the movable member 8 to quickly develop a relatively high force by reason of the discharge of the condenser and thus insure effective operation of the device.

I do not limit my invention to the particular arrangements illustrated, as many modifications may be made therein without departing from the spirit and scope of the invention, as set forth in the appended claims.

I claim as my invention:

1. In an electric circuit, the combination with a circuit interrupter and a trip coil therefor, of a series transformer operatively connected to the circuit, and a spark gap connected between the transformer and the trip coil.

2. In an electric circuit, the combination with a circuit interrupter, a trip coil therefor and a transformer for operatively connecting the trip coil to the circuit, of a spark gap connected in circuit with the trip coil and adapted to discharge and cause energization of the trip coil only when a predetermined current traverses the circuit.

3. In an electric circuit, the combination with a circuit interrupter, a trip coil therefor, and a transformer connected between the circuit and the trip coil, of a spark gap and a condenser connected to the trip coil to cause an oscillating current to energize the trip coil only when the current traversing the circuit exceeds a predetermined value.

In testimony whereof I have hereunto subscribed my name this 21st day of August, 1917.

CHESTER T. ALLCUTT.